United States Patent
Kong et al.

(10) Patent No.: US 7,877,071 B2
(45) Date of Patent: Jan. 25, 2011

(54) UNIFIED STTD/CLTD DEDICATED PILOT PROCESSING

(75) Inventors: Hongwei Kong, Denville, NJ (US); Li Fung Chang, Holmdel, NJ (US); Pan Liu, Cliffwood, NJ (US)

(73) Assignee: Broadcom Corporation, Irvine, CA (US)

( * ) Notice: Subject to any disclaimer, the term of this patent is extended or adjusted under 35 U.S.C. 154(b) by 608 days.

(21) Appl. No.: 11/964,066

(22) Filed: Dec. 26, 2007

(65) Prior Publication Data

US 2009/0036078 A1  Feb. 5, 2009

Related U.S. Application Data

(60) Provisional application No. 60/963,013, filed on Aug. 1, 2007.

(51) Int. Cl.
*H04B 17/00* (2006.01)
*H04B 1/06* (2006.01)

(52) U.S. Cl. ............... 455/226.1; 455/234.1; 455/272; 375/345

(58) Field of Classification Search .............. 455/132, 455/226.1, 234.1, 269, 272, 277.1, 277.2; 375/345, 346, 347

See application file for complete search history.

(56) References Cited

U.S. PATENT DOCUMENTS

| 7,212,838 | B2 * | 5/2007 | Raghothaman | 455/562.1 |
| 7,298,717 | B2 * | 11/2007 | Hui et al. | 375/347 |
| 7,391,817 | B2 * | 6/2008 | Lee | 455/132 |

OTHER PUBLICATIONS

3GPP TS 25.211 Technical Specification v6.7.0 (Dec. 2005) (Release 6); 3GPP Organizational Partners; Dec. 2005; pp. 1-50.

* cited by examiner

*Primary Examiner*—Quochien B Vuong
(74) *Attorney, Agent, or Firm*—Garlick Harrison & Markison

(57) ABSTRACT

Apparatus and method to provide unified STTD/CLTD dedicated pilot processing in a wireless receiver. The technique allows different set of parameters to be introduced to a same processing module to process STTD and CLTD diversity signals to recover a pilot signal. Introducing another set of parameters to the processing module also allows processing of a non-diversity signal to recover a pilot. The unified processing of STTD/CLTD signals is achieved by converting STTD/CLTD pilot bits as Hadamard-like bits and processing these bits along with orthogonal pilot bits which are encoded as Hadamard encoded bits.

20 Claims, 8 Drawing Sheets

UNIFIED STTD/CLTD DEDICATED PILOT PROCESSING

CROSS REFERENCE TO RELATED APPLICATION

This application claims the benefit of priority to U.S. Provisional Patent Application Ser. No. 60/963,013; filed Aug. 1, 2007; and titled "Unified STTD/CLTD dedicated pilot processing," which is incorporated herein by reference.

BACKGROUND OF THE INVENTION

1. Technical Field of the Invention

The present invention relates generally to wireless communication systems and, more particularly, to a unified technique of processing dedicated pilot segments of STTD and CLTD signals in diversity mode with a pilot segment in non-diversity mode for a downlink receiver in such a wireless communication system.

2. Description of Related Art

Mobile communication has changed the way people communicate and mobile phones have been transformed from a luxury item to an essential part of every day life. The use of mobile phones today is generally dictated by social situations, rather than being hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers want technologies that will allow them to increase downlink throughput and, in turn, offer advanced QoS capabilities and speeds that rival those delivered by cable modem and/or DSL service providers. In this regard, networks based on Wideband Code Division Multiple Access (WCDMA) technology may make the delivery of data to end users a more feasible option for today's wireless carriers.

The General Packet Radio Service (GPRS) and Enhanced Data rates for GSM Evolution (EDGE) technologies may be utilized for enhancing the data throughput of present second generation (2G) systems such as GSM. The Global System for Mobile telecommunications (GSM) technology may support data rates of up to 14.4 kilobits per second (Kbps), while the GPRS technology may support data rates of up to 115 Kbps by allowing up to 8 data time slots per time division multiple access (TDMA) frame. The GSM technology, by contrast, may allow one data time slot per TDMA frame. The EDGE technology may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The Universal Mobile Telecommunications System (UMTS) technology with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. With WCDMA, a number of new, communication channels are specified under the 3GPP telecommunication standard. For example, one of the channels that is utilized for establishing a radio link (RL) between User Equipment (UE) and a base station is a physical channel, such as the Dedicated Physical Channel (DPCH). DPCH conveys both data and control components in the downlink communication. The control part, also known as DPCCH, carries the dedicated pilot bits, transmit power control (TPC) bits and Transport format combination indicator (TFCI) bits. The data part, also known as the DPDCH, carries transport channel data.

For the dedicated pilot bits carried by the DPCH or DPCCH, they usually contain a known signal, such as a known sequence of bits, to aid the downlink receiver perform functions, such as channel estimation, noise power determination, signal power determination and/or signal-to-noise ratio determination. Other functions may be performed as well. A dedicated pilot that is included in a dedicated channel performs some or all of those functions in relation to the dedicated channel.

Dedicated pilot processing from a single transmitting antenna is generally known. However, as wireless communications attempt to improve signal transmission, many systems are now employing multiple antenna transmissions, which technique is commonly referred to as transmit diversity. One technique used in transmit diversity is Space Time Transmit Diversity (STTD). Another technique used in transmit diversity is Closed Loop Transmit Diversity (CLTD). A dedicated channel being transmitted in the transmit diversity mode may convey the same data, but the transmissions from the two antennas carry a different pilot signal. Because it is advantageous for a downlink receiver to have the ability to receive in any one of the potential transmitting modes, such a receiver in the UE would need to process the pilots in the various modes. For example, if a communication system is to allow for single antenna transmission, STTD transmission, CLTD transmission, or a combination thereof, a given receiver would need processing capability to operate in more than one mode. For the two transmit diversity modes, pilot patterns used on the two antennas in the DPCCH are chosen to be orthogonal. One undesirable consequence of this is in terms of SNR estimation. Although it works well for STTD in terms of SNR estimation, for CLTD the SNR estimated off the pilot bits does not truly reflect the SNR experienced by the data, if the same processing is to be followed as for STTD, in order to take advantage of the orthogonal pilot pattern. On the other hand, separate pilot processing circuitry and/or processing routines would typically increase the complexity of the UE. However, if a technique is develop to use the same circuitry and processing to accommodate the different modes of transmission while producing desired results for each transmit diversity mode, redundant circuitry/processes may not be needed and performance may be improved.

Accordingly, it would be advantageous to implement a unified processing technique to receive the different modes of transmission in a downlink receiver.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

DETAILED DESCRIPTION OF THE EMBODIMENTS OF THE INVENTION

The embodiments of the present invention may be practiced in a variety of settings that utilize a wireless communication receiver. The specific embodiments described below references one communication channel associated with a $3^{rd}$ Generation Partnership Project (3GPP) telecommunication technology. However, the invention need not be limited to such application and other embodiments of the invention may be implemented in other communications protocols and standards. Furthermore, the invention is not limited for use with WCDMA only and may be used in many other wireless technologies as well.

Figure 1:
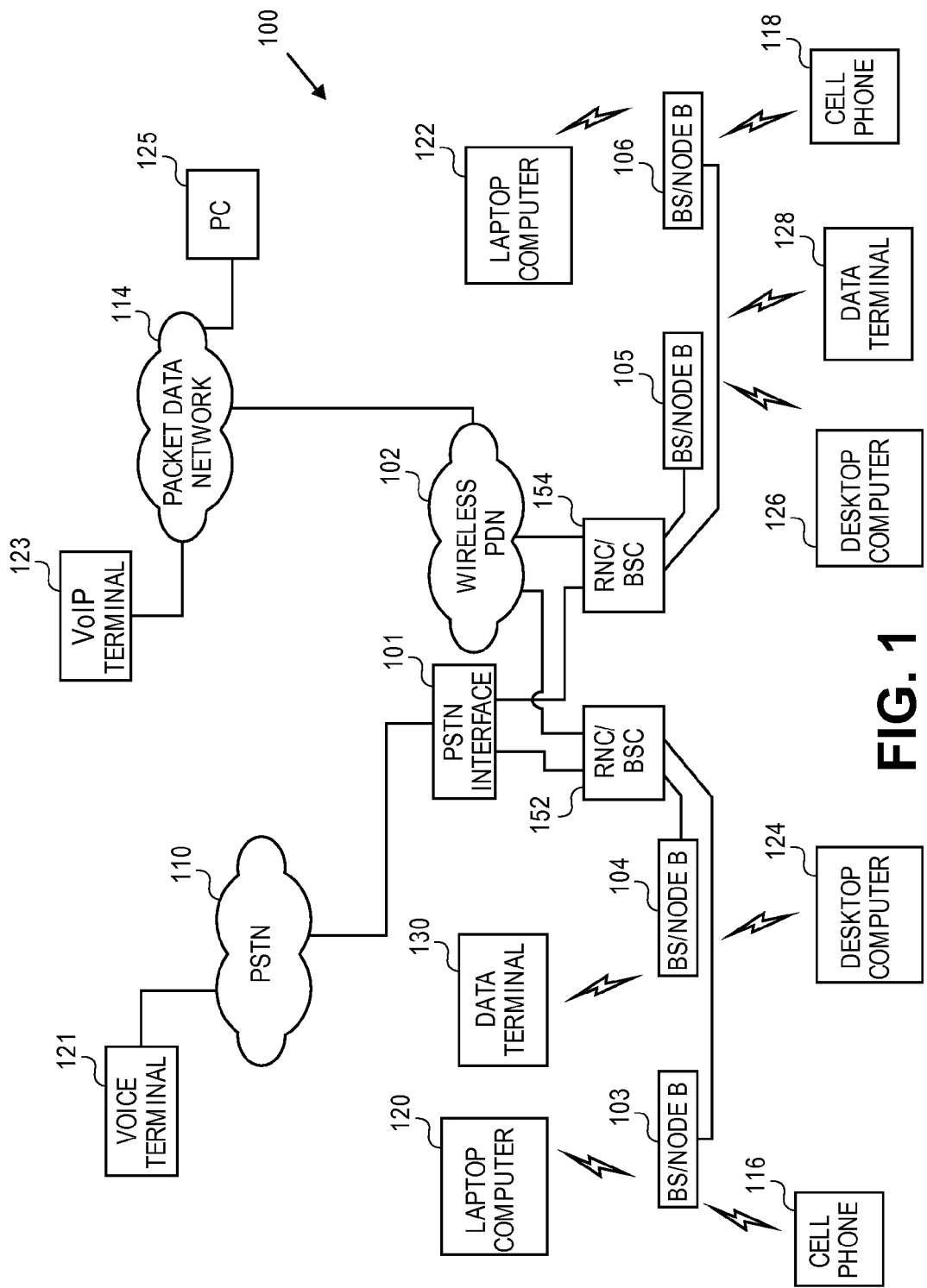
FIG. 1 is a system diagram showing a portion of a cellular wireless communication system that supports wireless devices operating according to a practice of the present invention.

FIG. 1 is a system diagram illustrating a portion of a cellular wireless communication system 100 that supports wireless terminals operating according to the practice of the invention. The cellular wireless communication system 100 includes a Public Switched Telephone Network (PSTN) interface 101 (such as a Mobile Switching Center), a wireless Packet Data Network (PDN) 102 (that may include GPRS Support Nodes, EDGE Support Nodes, WCDMA Support Nodes, and other components), Radio Network Controllers/Base Station Controllers (RNC/BSCs) 152 and 154, and base stations (BSs) 103, 104, 105, and 106, each of which are also referred to as Node B. The wireless network PDN 102 may be coupled to private and public packet data network 114, such as the Internet, WANs, LANs, etc. A conventional voice terminal 121 couples to a PSTN 110. A Voice over Internet Protocol (VoIP) terminal 123 and a personal computer (PC) 125 are shown coupled to the network 114. The PSTN Interface 101 may couple to a PSTN 110. Of course, this particular structure may vary from system to system and the particular system 100 is shown as an example only.

Each of the BS/Node Bs 103-106 services a cell or set of sectors within which it supports wireless communications. Wireless links that include both downlink components and uplink components support wireless communications between the base stations and their serviced wireless terminals. These wireless links support digital data communications, VoIP communications, and other digital multimedia communications. The cellular wireless communication system 100 may also be backward compatible in supporting analog operations as well. Cellular wireless communication system 100 supports one or more of the UMTS/WCDMA standards, the Global System for Mobile telecommunications (GSM) standards, the GSM General Packet Radio Service (GPRS) extension to GSM, the Enhanced Data rates for GSM (or Global) Evolution (EDGE) standards, and/or various other CDMA standards, TDMA standards and/or FDMA standards, etc. System 100 may also support one or more versions or "Releases" of the 3GPP telecommunication technology.

FIG. 1 also shows wireless terminals 116, 118, 120, 122, 124, 126, 128, and 130 coupled to cellular wireless communication system 100 via wireless links with base stations 103-106. As illustrated, wireless terminals may include cellular telephones 116 and 118, laptop computers 120 and 122, desktop computers 124 and 126, and data terminals 128 and 130. However, cellular wireless communication system 100 may support communications with other types of wireless terminals and devices as well. Devices such as laptop computers 120 and 122, desktop computers 124 and 126, data terminals 128 and 130, and cellular telephones 116 and 118, are typically enabled to "surf" the Internet, transmit and receive data communications such as email and text messaging, transmit and receive files, and to perform other data operations. Many of these data operations have significant download (downlink) data-rate requirements while the upload (uplink) data-rate requirements are not as severe. Some or all of wireless terminals 116-130 are therefore enabled to support the EDGE operating standard, the GPRS standard, the UMTS/WCDMA standards, the GSM standard and/or the 3GPP standard.

Figure 2:
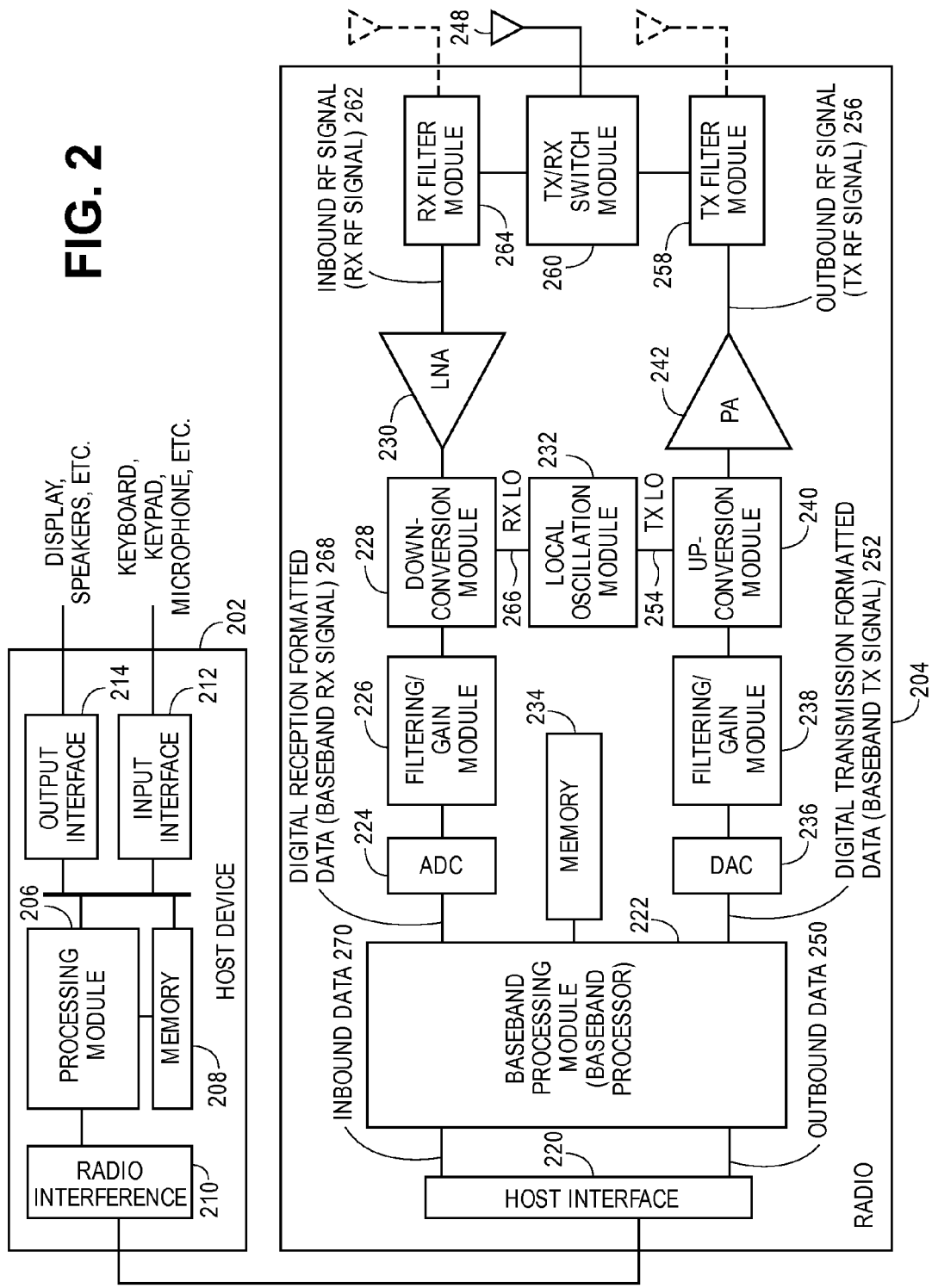
FIG. 2 is a circuit block diagram showing one embodiment of a wireless device for practicing of the present invention.

FIG. 2 is a schematic block diagram illustrating a wireless terminal that includes host processing components of a host device 202 and an associated radio 204. For cellular telephones, the host processing components of host device 202 and the radio are contained within a single housing. In some cellular telephones, the host processing components and some or all of the components of radio 204 are formed on a single Integrated Circuit (IC). For personal digital assistants hosts, laptop hosts, and/or personal computer hosts, radio 204 may reside within an expansion card and, therefore, reside separately from the host 202. The host processing components of host 202 may include a processing module 206, memory 208, radio interface 210, an input interface 212, and an output interface 214. Processing module 206 and memory 208 execute instructions to support host terminal functions. For example, for a cellular telephone host device, processing module 206 performs user interface operations and executes host software programs among other operations. Furthermore, as noted in FIG. 2, the host device may include or be coupled to one or more user interfaces (such as displays, speakers, headphones, keyboards, keypads, microphones, etc.).

Radio interface 210 allows data to be received from and sent to radio 204. For data received from radio 204 (e.g., inbound data), radio interface 210 provides the data to processing module 206 for further processing and/or routing to output interface 214. Output interface 214 provides connectivity to one or more output display devices. Radio interface 210 also provides data from processing module 206 to radio 204. Processing module 206 may receive the outbound data from one or more input device via input interface 212 or generate the data itself For data received via input interface 212, the processing module 206 may perform a corresponding host function on the data and/or route it to radio 204 via radio interface 210.

Radio 204 includes a host interface 220, baseband (BB) processing module 222 (baseband processor) 222, analog-to-digital converter (ADC) 224, filtering/gain module 226, down conversion module 228, low noise amplifier (LNA) 230, local oscillation module 232, memory 234, digital-to-analog converter (DAC) 236, filtering/gain module 238, up-conversion module 240, power amplifier (PA) 242, RX filter module 264, TX filter module 258, TX/RX switch module 260, and antenna 248. Antenna 248 may be a single antenna that is shared by transmit and receive paths or may include separate antennas for the transmit path and the receive path. The antenna implementation may depend on the particular standard to which the wireless communication device is compliant.

Baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling, and/or decoding. The digital transmitter functions include, but are not limited to, encoding, scrambling, constellation mapping, modulation, and/or digital baseband to IF conversion. The transmit and receive functions provided by baseband processing module 222 may be implemented using shared processing devices and/or individual processing devices. Processing devices may include microprocessors, micro-controllers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. Memory 234 may be a single memory device or a plurality of memory devices. Such a memory device may be a read-only memory, random access memory, volatile memory, non-volatile memory, static memory, dynamic memory, flash memory, and/or any device that stores digital information. Note that when baseband processing module 222 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry.

In operation, radio 204 receives outbound data 250 from the host processing components via host interface 220. Host interface 220 routes outbound data 250 to baseband processing module 222, which processes outbound data 250 in accordance with a particular wireless communication standard (e.g., UMTS/WCDMA, GSM, GPRS, EDGE, 3GPP, et cetera) to produce digital transmission formatted data 252. Digital transmission formatted data 252 is a digital base-band signal or a digital low IF signal.

Digital-to-analog converter 236 converts digital transmission formatted data 252 from the digital domain to the analog domain. Filtering/gain module 238 filters and/or adjusts the gain of the analog signal prior to providing it to up-conversion module 240. Up-conversion module 240 directly converts the analog baseband or low IF signal into an RF signal based on a transmitter local oscillation signal (TX LO) 254 provided by local oscillation module 232. Power amplifier 242 amplifies the RF signal to produce outbound RF signal 256, which is filtered by TX filter module 258. TX/RX switch module 260 receives the amplified and filtered RF signal from TX filter module 258 and provides output RF signal 256 signal to antenna 248, which transmits outbound RF signal 256 to a targeted device, such as to one of base stations 103-106 of FIG. 1.

Radio 204 also receives an inbound RF signal 262, which was transmitted by a base station via antenna 248, TX/RX switch module 260, and RX filter module 264. Low noise amplifier 230 receives inbound RF signal 262 and amplifies inbound RF signal 262 to produce an amplified inbound RF signal. Low noise amplifier 230 provides the amplified inbound RF signal to down conversion module 228, which converts the amplified inbound RF signal into an inbound low IF signal or baseband signal based on a receiver local oscillation signal (RX LO) 266 provided by local oscillation module 232. Down conversion module 228 provides the inbound low IF signal (or baseband signal) to filtering/gain module 226, which filters and/or adjusts the gain of the signal before providing it to analog to digital converter 224.

Analog-to-digital converter 224 converts the filtered inbound low IF signal (or baseband signal) from the analog domain to the digital domain to produce digital reception formatted data 268. Baseband processing module 222 demodulates, demaps, descrambles, and/or decodes the digital reception formatted data 268 to capture inbound data 270 in accordance with the particular wireless communication standard being implemented by radio 204. Host interface 220 provides inbound data 270 to the host processing components of host device 202 via radio interface 210.

Figure 3:
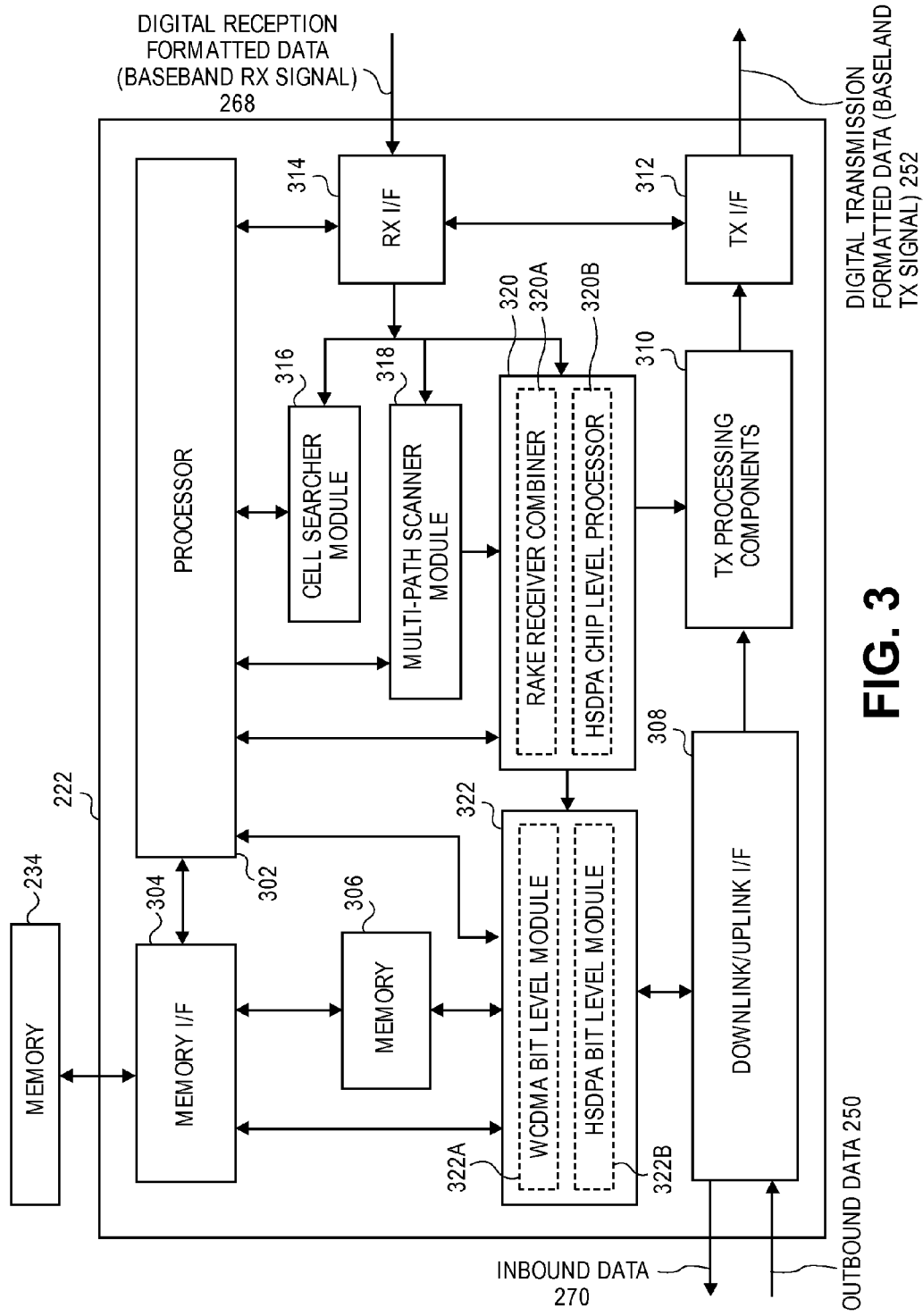
FIG. 3 is a block diagram illustrating components of a baseband processing module according to an embodiment of the present invention.

FIG. 3 is a block diagram illustrating one embodiment for baseband processing module 222 of FIG. 2. Components of baseband processing module (baseband processor) 222 include a processor 302, a memory interface 304, onboard memory 306, a downlink/uplink interface 308, TX processing components 310, and a TX interface 312. Baseband processing module 222 further includes an RX interface 314, a cell searcher module 316, a multi-path scanner module 318, a chip level processing module 320, and a bit level processing module 322.

Chip level processing module 320 includes a rake receiver combiner 320A that generally supports WCDMA receive processing operations and a HSDPA chip level processing module 320B that generally supports HSDPA receive processing operations. Bit level processing module 322 includes a WCDMA bit-level processing module 322A that supports WCDMA bit-level operations and a HSDPA bit-level processing module 322B that supports HSDPA bit-level operations.

In some embodiments, baseband processing module 222 couples to external memory 234. However, in other embodiments, memory 306 may fulfill the memory requirements of baseband processing module 302. According to some aspects of the present invention, memory 306 is cacheable while memory 234 is non-cacheable. Of course, in other embodiments, memory 234 may also be cacheable. As was previously described with reference to FIG. 2, baseband processing module 222 receives outbound data 250 from coupled host processing components 202 and provides inbound data 270 to the coupled host processing components 202. Further, baseband processing module 222 provides digital formatted transmission data (baseband TX signal) 252 to a coupled RF front end. Baseband processing module 222 receives digital reception formatted data (baseband RX signal) 268 from the coupled RF front end. As was previously described with reference to FIG. 2, an ADC 222 produces the digital reception formatted data (baseband RX data) 268 while DAC 236 of the RF front end receives the digital transmission formatted data (baseband TX signal) 252 from baseband processing module 222.

According to one particular embodiment of the present invention, the downlink/uplink interface 308 is operable to receive the outbound data 250 from coupled host processing components, e.g., the host processing component 202 via host interface 220. Further, the downlink/uplink interface 308 is operable to provide inbound data 270 to the coupled host processing components 202 via host interface 220. Baseband processing module 222 may be formed on a single integrated circuit with the other components of radio 204. Further, the radio 204 may be formed in a single integrated circuit along with the host processing components 202. Thus, in such case, all components of FIG. 2 excluding the antenna, display, speakers, keyboard, keypad, microphone, et cetera may be formed on a single integrated circuit. However, in still other embodiments, baseband processing module 222 and the host processing components 202 may be formed on a separate integrated circuit. Many differing integrated circuit constructs are possible without departing from the teachings of the present invention.

TX processing components 310 and TX interface 312 couple to the RF front end as illustrated in FIG. 2 and to downlink/uplink interface 308. TX processing components 310 and TX interface 312 are operable to receive the outbound data from downlink/uplink interface 304, to process the outbound data to produce baseband TX signal 252 and to output baseband TX signal 252 to the RF front end as was described with reference to FIG. 2.

RX processing components, including cell searcher module 316, multi-path scanner module 318, chip level processing module 320, and in some cases processor 302, are operable to receive the RX baseband signal 268 from the RF front end as processed by RX I/F 314. Generally, RX I/F 314 produces soft symbols representing the digital reception formatted data 268 in a format suitable for use by these components. HSDPA chip level processing module 320B is operable to produce soft symbols output for use by processing module 322 for further processing, such as turbo coding.

Figure 4:
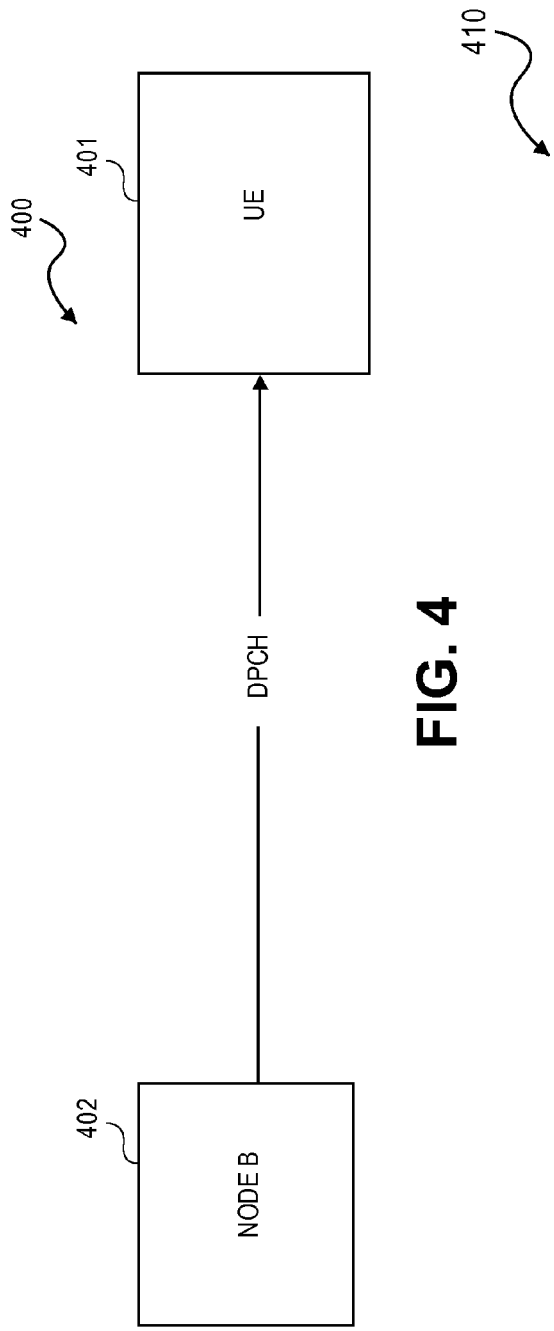
FIG. 4 is a diagram showing a radio link between a UE and Node B, in which the DPCH channel is illustrated.

FIG. 4 shows a diagram of a radio link 400 between a User Equipment (UE) 401 and Node B 402. UE 401 may be one of a variety of downlink devices used for wireless communications. UE 401 may be one of the wireless terminals noted in FIG. 1. Node B 402 may be one of a variety of uplink devices used for wireless communications. Node B 402 may be may be one of the BS/Node Bs noted in FIG. 1. UE 401 and/or Node B may implement part of or all of the components, modules, devices, circuits noted in FIG. 2 and/or FIG. 3.

UE 401 and Node B 402 may communicate using one or more communication protocols or standards, in which communication is achieved by establishing a downlink (DL) and/or uplink (UL) channel(s) for control signal and data transfer. Various communication standards and protocols may be used to communicate between UE 401 and Node B 402, including the 3GPP standard. In particular, one downlink channel, referenced as the Dedicated Physical Channel (DPCH), is shown in FIG. 4.

Figure 5:
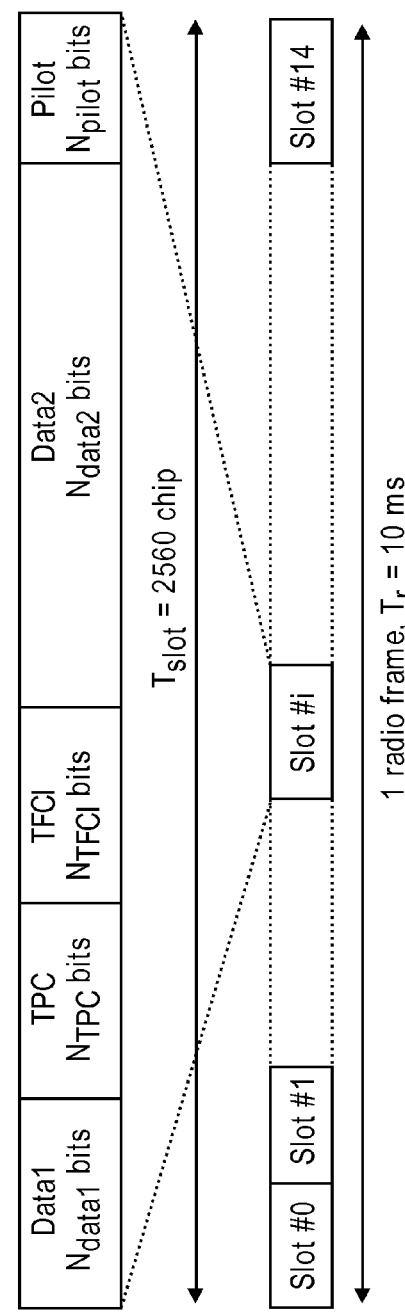
FIG. 5 shows a frame structure for a DPCH channel based on a 3GPP standard.

DPCH is a dedicated downlink physical channel that is used to convey both control information and data from Node B 402 to UE 401. One implementation of DPCH is described with reference to FIG. 5. In FIG. 5, an example DPCH frame 410 is shown. Frame 410 is 10 msec in duration with 15 slots (slot #0-#14). In the particular example, each slot "i" of frame 410 has a chip rate of 2560. Each DPCH slot is divided into a number of segments or components of which some are data and some are control signals. In the particular example shown, frame 410 is comprised of Transmit Power Control (TPC) bits, Transport Format Combination Indicator (TFCI) bits, Pilot bits and Data bits. TPC bits ($N_{TPC}$ bits) are used for power control by the UE and TFCI bits ($N_{TFCI}$ bits) are used to inform the receiver about the transport format combination of the transport channels carried in Data1 and Data2 of the same DPCH channel. The pilot bits ($N_{pilot}$ bits) support SNR estimation and may be used for channel estimation for coherent detection. TPC, TFCI and pilot bits are control bits associated with DPCH. In some instances, TFCI may not be present, where only a fixed-rate services are present.

The data portion of DPCH frame 410 may have one data segment or multiple data segments. In the example of FIG. 5, two segments are shown, Data1 and Data2. Data1 bits ($N_{data1}$ bits) are shown located at the beginning of the slot, while Data2 bits ($N_{data2}$ bits) are shown located after TFCI. The Data bits are used to convey data information to the UE.

Figure 6A:
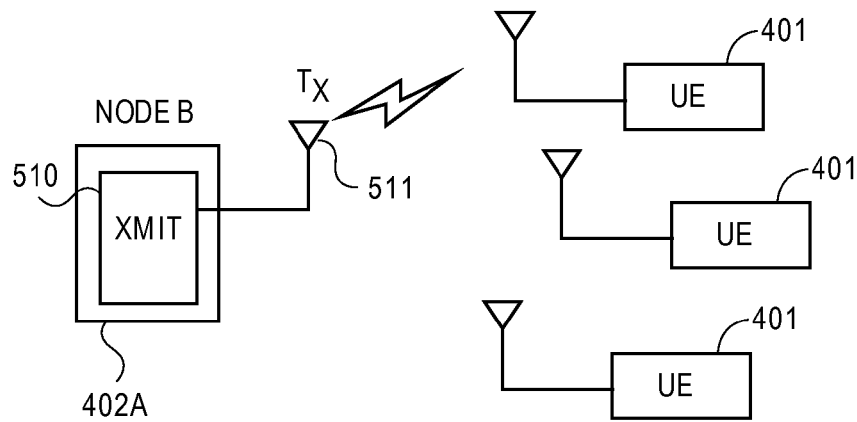
FIG. 6A shows Node B transmitting to multiple UEs where the transmission uses a single antenna in a non-diversity mode.
Figure 6B:
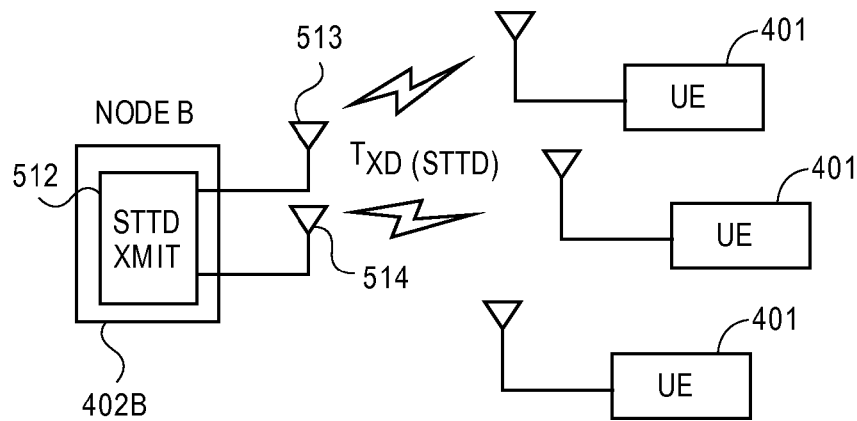
FIG. 6B shows Node B transmitting to multiple UEs where the transmission uses STTD diversity mode.
Figure 6C:
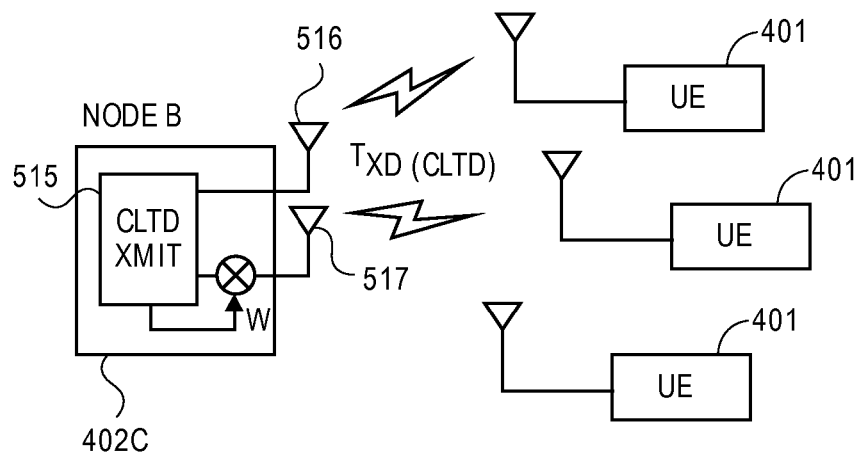
FIG. 6C shows Node B transmitting to multiple UEs where the transmission uses CLTD diversity mode.

FIG. 6A-C illustrate three of the transmission modes that are operative with a receiver that implements an embodiment of the invention. As will be described below, a common processing of a pilot signal may be performed, even though the pilot signal has a different content depending on the mode of transmission.

FIG. 6A shows a scenario in which Node B 402A transmits to UEs 401. In this scenario, transmitter 510 transmits in a non-diversity mode using a single antenna 511. FIG. 6B shows a scenario in which a transmitter 512 of Node B 402B transmits to UEs 401 using Space Time Transmit Diversity (STTD). Diversity antennas 513 and 514 transmit the STTD signal. FIG. 6C shows a scenario in which a transmitter 515 of Node B 402C transmits to UEs 401 using Closed Loop Transmit Diversity (CLTD). In STTD the same data stream are transmitted on the two antennas using different block coding technique while in CLTD the same data stream are transmitted on both antennas without any coding but the second antenna data is rotated by a weight W so that coherent combination is achieved at the UE antenna input. Diversity antennas 516 and 517 transmit the CLTD signal.

Figure 7:
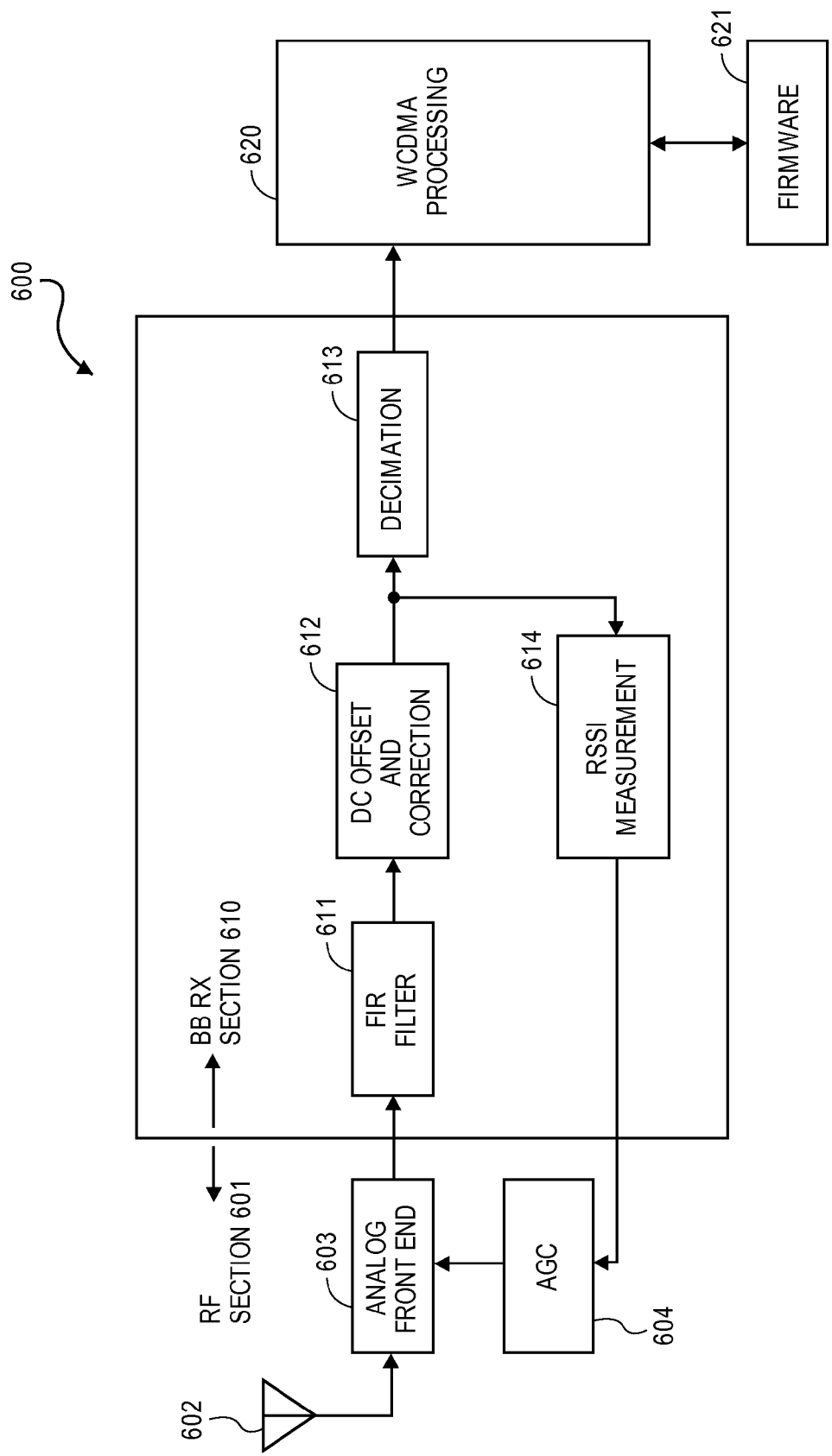
FIG. 7 is a block diagram of a receiver portion of a wireless communication device used to practice an embodiment of the invention.

FIG. 7 shows one example embodiment of a receiver portion of UE 401. A receiver 600 receives a DPCH signal at antenna 602 and couples the radio frequency (RF) signal to analog front end 603. RF section 601 of receiver 600 may employ other front end sections and is not limited to the shown analog front end 603. Converted output from analog front end 603 is then coupled to a receiver section of a baseband processing module (BB RX) 610 for baseband processing. BB RX 610 includes a finite-impulse-response (FIR) filter 611, DC offset and correction module 612 and decimation module 613 to perform baseband processing of the received signal. A RSSI measurement module 614 may also be included to provide received signal strength indication to automatic gain control (AGC) module 604, which is part of RF section 601. Radio 204 of FIG. 2 may be readily implemented for RF and BB RX sections 601, 610. Baseband processing module 222 of FIG. 3 may also be incorporated as part of receiver 600. It is to be noted that a variety of designs may be implemented for receiver 600.

Output from BB RX 610 is coupled to WCDMA processing module 620 for further WCDMA signal processing with conjunction with processing firmware 621. In one embodiment, WCDMA processing module 620 and firmware 621 reside within a host, such as host device of FIG. 2. In other implementations, WCDMA processing module 620 and/or firmware 621 may reside within baseband processing module 222. Module 620 may reside elsewhere as well. In the particular example shown in FIG. 7, WCDMA processing module 620 and firmware 621 reside in baseband processing module 222. It is also to be noted that wireless communications may also employ various finger processing and in one embodiment, WCDMA processing module 620 includes such finger processing, as noted by multi-path scanner 318 and rake receiver combiner 320B of baseband processing module 222. Finger processing techniques for wireless communications are generally known in the art.

As noted in FIGS. 6A-C, a particular Node B may transmit in one of multiple modes, depending on the wireless communication system being implemented. That is, a wireless system may have both single antenna transmission and diversity antenna transmission, in which the diversity transmission may be further differentiated between STTD and CLTD. When multiple modes of transmission are possible, a UE operating in a particular sector needs to identify which one of the modes is being implemented by a given Node B. Furthermore, once this differentiation is made, the UE then responds by processing the received signal accordingly. Pilot signal is used to estimate a Signal-to-Noise Ratio (SNR) in order to generate a power control command for uplink transmission. Instead of implementing multiple circuitry to process the different modes of transmission noted in FIGS. 6A-C, a practice of an embodiment of the invention allows for a unified technique to process pilot signals in both non-diversity and diversity modes of transmission. Further, in one described embodiment below, the unified technique allows either STTD or CLTD diversity modes of transmission to be processed, along with the non-diversity mode. In one embodiment, the pilot signal of DPCH is processed by the unified technique.

Figure 8:
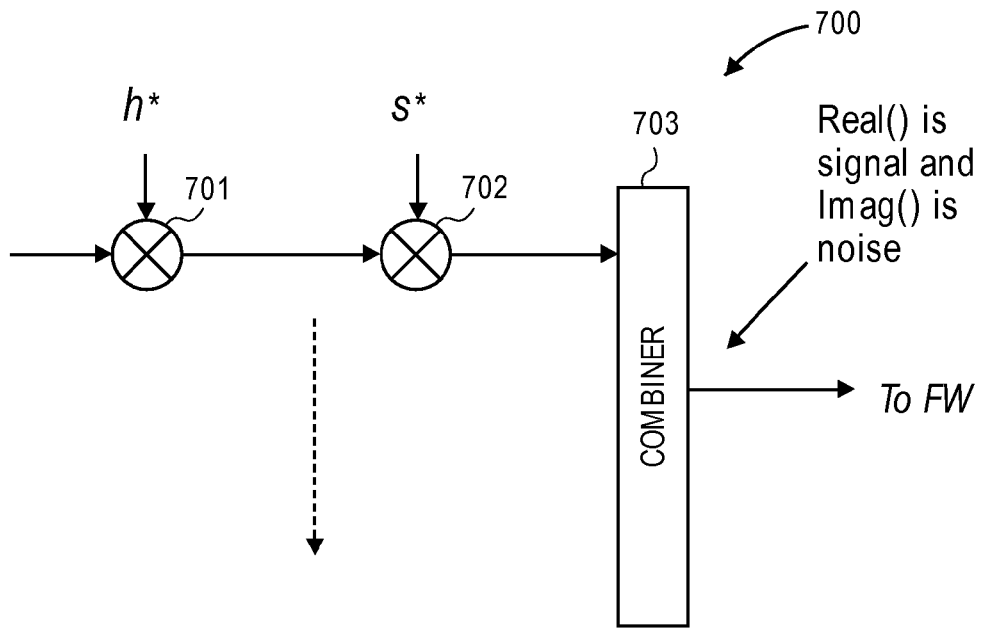
FIG. 8 shows one embodiment for a processing module to process a pilot signal when Node B is transmitting in the non-diversity mode of FIG. 6A.

FIG. 8 illustrates the processing within the UE for the scenario shown in FIG. 6A where a single non-diversity antenna is present. There is only one pilot signal "s" transmitted from the single antenna 511. In this instance, the pilot signal is recovered by the operation 700 noted in FIG. 8. On a given finger, the received signal "r" may be expressed as $$r = h \cdot s + n,$$

where h is a complex channel, s is a pilot symbol (e.g. normalized, QPSK) and n is interference plus noise. Assume channel estimate has no error, so it is just a scaled version of h, and h is used here for simplicity of explanation. Multipliers 701, 702 provide the multiplying operations and the soft symbol that is sent to a combiner 703 may be represented as $$R = r \cdot h^* \cdot s^* = |h|^2 + n \cdot h^* \cdot s^*$$

Combiner 203 performs the operation of combining one or more finger inputs to generate a result $$\sum_f R_f,$$

where the real component part represents the signal and the imaginary component part represents noise. The output of combiner 703 may be sent to firmware (FW) to perform calculations to determine a SNR value. Note that there may be multiple instantiations of the processing provided to the input signal r depending on the number of finger processing used.

When STTD and CLTD transmissions of FIGS. 6B and 6C are utilized in diversity modes, there are two separate signal transmissions due to the two antennas. In this instance, pilot symbols $S_0$ and $S_1$ indicate signals that are transmitted in sequence from a first antenna (such as antenna 513 for STTD and 516 for CLTD) and $S_0^*$ and $S_1^*$ indicate corresponding pilot symbols that are transmitted from a second antenna (such as antenna 514 for STTD and 517 for CLTD). Generally, the dedicated pilot patterns are shared for CLTD and STTD when Npilot (number of dedicated pilot bits per slot) is larger than 2. For a protocol, such as 3GPP, the defined transmitted pilot patterns in diversity modes is a combination of STTD encoded pilot bits (stated as STTD bits for short) and orthogonal pilot bits (which are defined to be Hadamard encoded pilot bits or Hadamard bits for short).

Figure 9:
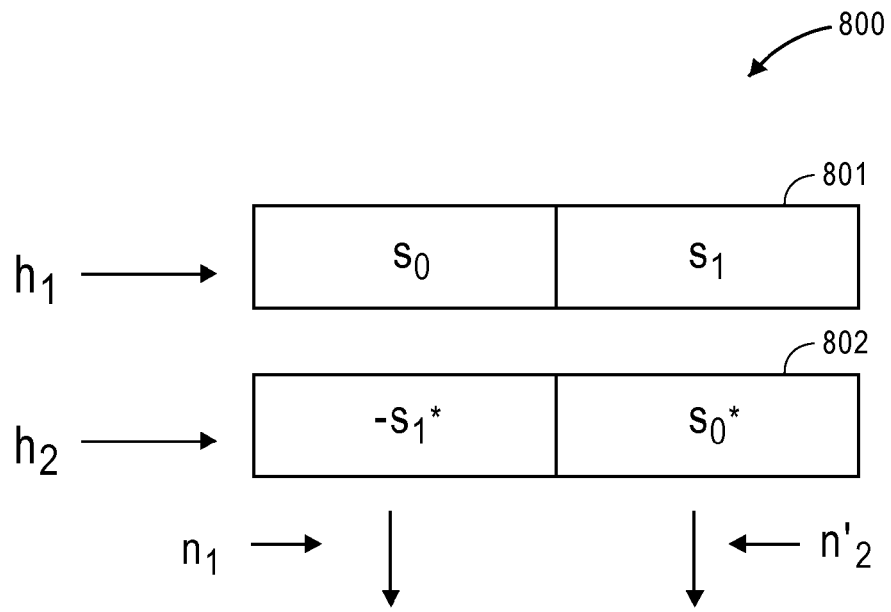
FIG. 9 shows one technique for processing both STTD and CLTD transmissions in the diversity mode.

In order to obtain unified processing, the $S_0$ and $S_1$ symbols from the first antenna are transmitted normally in order, but the $S_0^*$ and $S_1^*$ symbols from the second antenna are transmitted in reverse order with the $S_1^*$ symbol having an opposite sign value. Thus, the transmission from the second antenna is $-S_1^*$ and $S_0^*$. This order is shown in FIG. 9. As noted below, the particular symbol reordering from the second antenna in diversity mode allows for unified processing of STTD/CLTD bits and Hadamard bits in recovering the pilot signal from Node B.

For STTD transmission, the STTD bits may be converted to Hadamard-like bits, instead of using the standard conventional STTD bits. The adjustment may be performed in the recovery of the pilot by changing a decoding value between STTD bits and Hadamard bits. FIG. 9 shows a processing 800 of the received signal for STTD encoded symbols. As noted, for channel $h_1$ from the first transmitting antenna, the $S_0$ and $S_1$ sequence do not change (box 801). However, for channel $h_2$ from the second transmitting antenna, the order is reversed and a negative value of $S_1^*$ is used, so that the processing values for channel $h_2$ are $-S_1^*$ and $S_0$, in that order (box 802). Accordingly, the following equation represents the recovery of the received signals $r_1$ and $r_2'$, where $r_1$ and $r_2'$ denote the received signals in time sequence for time $t_1$ and time $t_2$. Representation $r_2'$ is used to show that further processing is to be performed to derive $r_2$. Therefore, $$r_1 = h_1 \cdot s_0 - h_2 \cdot s_1^* + n_1$$

$$r_2' = h_1 \cdot s_1 + h_2 \cdot s_0^* + n_2'$$

Then, a rotation operation is performed on $r_2'$ by the symbol $s_0/s_1$ to derive the result $$r_2 = r_2' \cdot \frac{s_0}{s_1}$$

$$= h_1 \cdot s_0 + h_2 \cdot \frac{|s_0|^2}{s_1} + n_2' \cdot \frac{s_0}{s_1}$$

$$= h_1 \cdot s_0 + h_2 \cdot \frac{|s_1|^2}{s_1} + n_2$$

$$= h_1 \cdot s_0 + h_2 \cdot s_1^* + n_2$$

Writing this together with $r_1$ results in the following:

$$r_1 = h_1 \cdot s_0 - h_2 \cdot s_1^* + n_1$$

$$r_2 = h_1 \cdot s_0 + h_2 \cdot s_1^* + n_2$$

The rotation operation places the two equations in a similar format where a summation of the two may be performed to recover the pilot symbol. In one embodiment for a particular pilot pattern for 3GPP, when $s_1=-s_0^*$, the format is the same as the Hadamard orthogonal sequence, also used for pilot bit patterns for $N_{pilot}>4$.

For CLTD, the same technique may be used, since dedicated pilot patterns are shared for CLTD and STTD. CLTD is different from STTD, in that a weight value is applied in the recovery of the CLTD pilot. Thus, instead of using conventional STTD/CLTD bits, the Hadamard encoded pilot bits are transmitted in the sequence described above and processed accordingly in the receiver for recovery of the pilot. By performing the above operations, STTD and CLTD signals may be processed in a unified way, and in the mean time, the SNR estimated from the pilot reflects the difference of different transmit diversity mode, such as STTD and CLTD.

Figure 10:
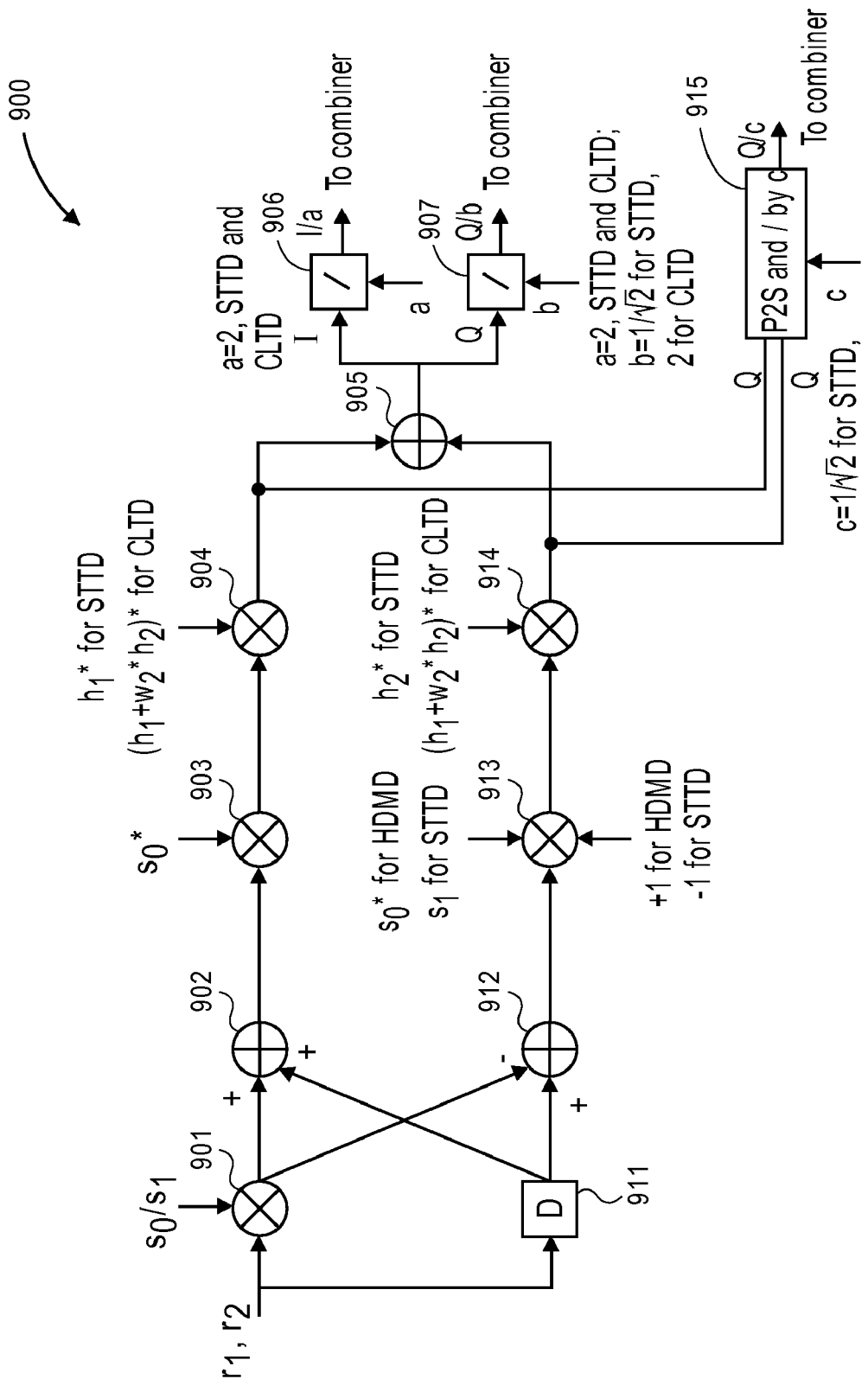
FIG. 10 shows one embodiment for a processing module to process a pilot signal when Node B is transmitting in the diversity mode of FIGS. 6B and 6C.

A processing module 900 is shown in FIG. 10, in which the reception of both STTD and CLTD pilot signals may be processed in the same module. Processing module 900 performs the operations noted above in reference to FIG. 9. Signal $r_2'$ is sent through the upper path noted by operators 901, 902, 903 and 904. Signal $r_1$ is sent through the lower path noted by delay ("D") unit 911 and operators 912, 913 and 914. Signal $r_2'$ is converted to $r_2$ by the rotation operation $S_0/S_1$ by operator 901. Delay unit 911 is used to introduce a delay in $r_1$ through the lower path, in which the delay is equivalent to the delay of operator 901 to maintain proper timing through the two paths. Note that operators 902, 912 and 905 are summers, while operators 901, 903, 904, 913 and 914 are multipliers.

Note that in the particular embodiment for operating on STTD and CLTD pilot symbols for 3GPP protocol, the parameters input to operator 913 is dependent on whether STTD bits or Hadamard (HDMD) bits are being recovered. Likewise, STTD and CLTD pilot recovery is also adjusted by providing appropriate parameter inputs to operators 904 and 914, depending on which is being recovered. For STTD, the channel estimates are antenna specific, so that $h_1^*$ is used with operator 904 in the upper branch and $h_2^*$ is used with operator 914 in the lower branch. For CLTD, the same combined channel estimate $(h_1+w_2^*h_2)^*$ is applied to both branches and used with both operators 904, 914.

The processed outputs of the two paths are summed in operator 905 and the real and imaginary components are further processed separately by operators 906, 907. The real and imaginary components are sent to a combiner. Note that normalization factors "a" and "b" are used, which values differ depending on STTD or CLTD signal processing. Furthermore, a separate output may be taken through operator 915, which provides a parallel to serial (P2S) operation, to generate a serial output, which is also normalized by normalization factor "c".

It is to be noted that I (In-phase) outputs are sent to the combiner for signal power estimation while Q (Quadrature) outputs are sent to the combiner for noise power estimation. Furthermore, it is to be noted that the upper path of the processing module 900, minus the first two operators 901, 902, is equivalent to processing module 700 of FIG. 8. Accordingly, because of the equivalent processing, the same hardware structure may provide processing for the received signal in a single antenna transmission (non-diversity mode), as well as either one of the STTD/CLTD signals in a diversity mode of transmission. Only the parameter values vary.

Thus, a unified STTD/CLTD dedicated pilot processing is described for diversity transmission, in which the unified technique is also compatible for non-diversity transmission.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items.

Furthermore, the term "module" is used herein to describe a functional block and may represent hardware, software, firmware, etc., without limitation to its structure. A "module" may be a circuit, integrated circuit chip or chips, assembly or other component configurations. Accordingly, a "processing module" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions and such processing device may have accompanying memory. A "module" may also be software or software operating in conjunction with hardware.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. Similarly, flow diagram blocks and methods of practicing the embodiments of the invention may also have been arbitrarily defined herein to illustrate certain significant functionality. To the extent used, the flow diagram block boundaries and methods could have been defined otherwise and still perform the certain significant functionality. Such alternate definitions of functional building blocks, flow diagram blocks and methods are thus within the scope and spirit of the claimed embodiments of the invention. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

We claim:

1. A method comprising:
   receiving a downlink signal in a wireless receiver;
   determining if the downlink signal is a non-diversity signal or a diversity signal;

applying a first set of parameters to a processing module when the downlink signal is a non-diversity signal;

applying a second set of parameters to the processing module when the downlink signal is a Space Time Transmit Diversity (STTD) signal;

applying a third set of parameters to the processing module when the downlink signal is a Closed Loop Transmit Diversity (CLTD) signal; and processing a pilot portion of the received signal in the same processing module by selecting an appropriate set of parameters based on whether the downlink signal is the non-diversity signal, STTD signal or CLTD signal.

2. The method of claim 1, wherein processing the pilot portion includes using equivalent processing steps for unified processing of the STTD signal and the CLTD signal, but with use of different set of parameters.

3. The method of claim 2, wherein receiving the downlink signal includes receiving in sequence pilot signals $S_0$ and $S_1$ transmitted from a first diversity antenna when the downlink signal is a diversity signal, but sequence $S_0^*$ and $S_1^*$ from a second diversity antenna is transmitted as $-S_1^*$ and $S_0^*$ in sequence to encode STTD and CLTD for the unified processing.

4. The method of claim 3, wherein processing the pilot signal includes processing the second of the sequence $S_1$ and $S_0^*$ transmitted from the two diversity antennas by first rotating the received second sequence by a symbol $S_0/S_1$, but not rotating the first of the sequence $S_0$ and $-S_1^*$.

5. The method of claim 4, wherein processing the pilot portion of the received signal in the same processing module includes selecting a channel estimate parameter $h_1^*$ for a signal from a first diversity antenna and a channel estimate $h_2^*$ for a signal from a second diversity antenna as channel estimate parameters for a received STTD signal.

6. The method of claim 4, wherein processing the pilot portion of the received signal in the same processing module includes selecting a combined channel estimate parameter $(h_1+w_2^*h_2)^*$ for a signal from a first diversity antenna and for a signal from a second diversity antenna, as combined channel estimate parameters for both channels for a received CLTD signal.

7. The method of claim 4, wherein receiving the downlink signal includes receiving one of a downlink channels defined in a $3^{rd}$ Generation Partnership Project standard specification.

8. The method of claim 7, wherein the downlink channel is a Dedicated Physical Channel (DPCH).

9. A method comprising:

receiving a downlink signal in a wireless receiver, in which the downlink signal includes pilot signals $S_0$ and $S_1$ that are transmitted in sequence as $S_0$ and $S_1$ from a first diversity antenna when the downlink signal is a diversity signal, and the downlink signal also includes corresponding pilot signals $S_0^*$ and $S_1^*$ that are transmitted from a second diversity antenna, but the pilot signals $S_0^*$ and $S_1^*$ from the second diversity antenna are transmitted as $-S_1^*$ and $S_0^*$ in sequence to encode for Space Time Transmit Diversity (STTD) and Closed Loop Transmit Diversity (CLTD) for unified processing in the receiver;

rotating second of the sequence $S_1$ and $S_0^*$ transmitted from the two diversity antennas by a symbol $S_0/S_1$, but not rotating the first of the sequence $S_0$ and $-S_1^*$;

applying a first set of parameters to the processing module when the downlink signal is a Space Time Transmit Diversity (STTD) signal;

applying a second set of parameters to the processing module when the downlink signal is a Closed Loop Transmit Diversity (CLTD) signal; and processing a pilot portion of the received signal in a same processing module by selecting an appropriate set of parameters based on whether the downlink signal is the STTD signal or the CLTD signal.

10. The method of claim 9 further including receiving a non-diversity signal S transmitted from a single transmitting antenna, applying a third set of parameters to the received non-diversity signal and processing the non-diversity signal using a portion of the same processing module to process a pilot portion of the received non-diversity signal.

11. The method of claim 9, wherein a pilot pattern for the STTD signal includes a mixture of STTD encoded pilot bits and orthogonal pilot bits that are encoded as Hadamard encoded bits, wherein when receiving the downlink signal, the STTD encoded bits are converted to Hadamard-like bits and both encoded bits are processed equivalently in the processing module.

12. The method of claim 9, wherein processing the pilot portion of the received signal in the same processing module includes selecting a channel estimate parameter $h_1^*$ for a signal from a first diversity antenna and a channel estimate $h_2^*$ for a signal from a second diversity antenna as channel estimate parameters for a received STTD signal.

13. The method of claim 9, wherein processing the pilot portion of the received signal in the same processing module includes selecting a combined channel estimate parameter $(h_1+w_2^*h_2)^*$ for a signal from a first diversity antenna and for a signal from a second diversity antenna, as combined channel estimate parameters for both channels for a received CLTD signal.

14. The method of claim 9, wherein receiving the downlink signal includes receiving one of a downlink channels defined in a $3^{rd}$ Generation Partnership Project standard specification.

15. The method of claim 14, wherein the downlink channel is a Dedicated Physical Channel (DPCH).

16. An apparatus comprising:

a radio receiver to receive a downlink signal;

a processing module coupled to the radio receiver to process the downlink signal when the downlink signal is a diversity signal that includes pilot signals $S_0$ and $S_1$, which are transmitted in sequence as $S_0$ and $S_1$ from a first diversity antenna, and when the downlink signal also includes corresponding pilot signals $S_0^*$ and $S_1^*$ which are transmitted from a second diversity antenna, but the pilot signals $S_0^*$ and $S_1^*$ from the second diversity antenna are transmitted as $-S_1^*$ and $S_0^*$ in sequence to encode for Space Time Transmit Diversity (STTD) and Closed Loop Transmit Diversity (CLTD), the processing module to rotate second of the sequence $S_1$ and $S_0^*$ transmitted from the two diversity antennas by a symbol $S_0/S_1$, but not rotating the first of the sequence $S_0$ and $-S_1^*$, and the processing module to apply a first set of parameters to recover a pilot portion of the received downlink signal when the downlink signal is a Space Time Transmit Diversity (STTD) signal and to apply a second set of parameters to recover the pilot portion of the received downlink signal when the downlink signal is a Closed Loop Transmit Diversity (CLTD) signal.

17. The apparatus of claim 16, wherein the processing module further processes the downlink signal when the downlink signal is a non-diversity signal S transmitted from a single transmitting antenna, in which the processing module to apply a third set of parameters to the received non-diversity signal and to process the non-diversity signal using a portion of a same processing circuitry used to process the STTD and CLTD signals to recover a pilot portion of the received non-diversity signal.

18. The apparatus of claim 16, wherein the processing module uses a channel estimate parameter $h_1^*$ for a signal from a first diversity antenna and a channel estimate $h_2^*$ for a signal from a second diversity antenna as channel estimate parameters to process a received STTD signal.

19. The apparatus of claim 16, wherein processing module uses a combined channel estimate parameter $(h_1+w_2^*h_2)^*$ for a signal from a first diversity antenna and for a signal from a second diversity antenna, as combined channel estimate parameters for both channels to process a received CLTD signal.

20. The apparatus of claim 16, wherein the downlink channel is a Dedicated Physical Channel (DPCH).

* * * * *